United States Patent [19]
Sestak et al.

[11] Patent Number: 5,515,428
[45] Date of Patent: May 7, 1996

[54] MULTIPLE QUEUE RESOURCE MANAGEMENT

[75] Inventors: Mark R. Sestak; Paul A. Erb, both of Ottawa, Canada

[73] Assignee: Mitel Corporation, Canada

[21] Appl. No.: 225,655

[22] Filed: Apr. 11, 1994

[30]     Foreign Application Priority Data

Apr. 16, 1993 [CA] Canada ................................. 2094210

[51] Int. Cl.⁶ ............................. H04J 3/12; H04M 3/00
[52] U.S. Cl. ...................... 379/266; 379/265; 379/309; 370/85.13; 370/68.1
[58] Field of Search ................................. 379/265, 266, 379/309, 207; 370/85.13, 68.1

[56]         References Cited
         U.S. PATENT DOCUMENTS

| | | | |
|---|---|---|---|
| 4,615,028 | 9/1986 | Lewis | 370/68.1 |
| 4,616,360 | 10/1986 | Lewis | 370/58.1 |
| 4,964,155 | 10/1990 | Pinard | 379/136 |
| 5,134,652 | 7/1992 | Brown | 379/163 |
| 5,140,590 | 8/1992 | Gertsman | 370/68.1 |
| 5,168,515 | 12/1992 | Gechter | 379/265 |
| 5,278,898 | 1/1994 | Cambray | 379/265 |
| 5,311,574 | 5/1994 | Livanos | 379/88 |

Primary Examiner—Jeffery Hofsass
Assistant Examiner—Thomas F. Presson
Attorney, Agent, or Firm—Laff, Whitesel, Conte & Saret, Ltd.

[57]                    ABSTRACT

A method of resource management for elements interfacing a communication control system is comprised of firstly providing a queue list containing a sequence of fields. Each field contains at least the number of a queue in which the element is contained. A table of queue records is provided, each containing at least a head pointer to a first element in the queue list. A record of the table is accessed, and the head pointer stored therein is retrieved. The element number represented by the head pointer is accessed for use by the control system.

12 Claims, 3 Drawing Sheets

MULTIPLE QUEUE RESOURCE MANAGEMENT

FIELD OF THE INVENTION

This invention relates to telephone switching systems and in particular to management systems for resource elements used therein.

BACKGROUND TO THE INVENTION

Telephone switching systems such as PABXs and central offices provide specialized applications. For example, one type of specialized application is automatic call distribution (ACD) which distributes incoming calls among agents. Such systems can be used for answering inquiries as to departure or arrival times of aircraft, to take reservations for theatre, aircraft, trains, etc.

In such ACD systems, agents are typically grouped in hunt groups of telephones, each hunt group defining a community of interest. Every telephone or other station apparatus, such as a computer terminal is accessible through a telephone number, which often is an 800 number.

When a subscriber calls that telephone number, the telephone system routes the call to an idle agent within a hunt group of agents accessed by the number. All agents within the group are accessible by the same number, but the system determines which agent has been the "longest idle agent" and routes the call to that agent. If all telephones within that hunt group are busy, the caller is often routed to a recorded announcement device which informs the caller that the call will be serviced as soon as an agent becomes available.

In previous ACD systems, such as provided in conjunction with the telephone systems sold by Mitel Corporation under the type designations SX2000™, and SX200D™, a hunt group is created which contains the numeric designation of all of the agents, e.g. "5001", "5002", ... "5010". A free list is established whose maximum size is equivalent to the maximum number of agents which can be programmed into the system. This list is in one to one correspondence with an array of agent records which, among other items, contains an unique number to identify each particular agent.

When an agent logs onto the system, the agent is added to the end of the free list, which thus designates that the agent is ready to receive calls.

When a call arrives to a hunt group number, the free list of agents is traversed from start to the end. For every agent on the free list, a lookup occurs to determine if the agent is a member of the dialed hunt group. If the determination is positive, the system has an indication that this is the "longest idle agent" (due to the ordering of the free list). The call is then routed to the agent and the agent record is removed from the free list. When the agent completes the servicing of the call and returns to the idle state, the agent record is added to the end of the free list. Since the record is added to the end of the free list, the records are automatically in the "longest idle agent" order if the free list is traversed from start to end.

However this type of system has exhibited certain problems. In particular, the time to locate an idle agent for a particular hunt group has been found to be excessive if the free list is large and an idle agent for the hunt group either does not exist or exists near the end of the free list. This excessive time occurs because either the entire or nearly the entire list must be checked before the idle agent for that hunt group is located or if it is determined that no idle agent exists.

SUMMARY OF THE PRESENT INVENTION

The present invention provides a method for substantially increasing the speed at which a longest idle agent for a particular hunt group is determined.

While the description herein is directed mainly to the example of the availability of a free list of agents, or to a queue list, it should be noted that the invention is not restricted for use to provide an ACD system, but is applicable to management of any analogous resource, the use of which can be controlled by the system.

In accordance with an embodiment of the invention, a method of resource management for elements interfacing a communication control system is comprised of firstly providing a queue list containing a sequence of fields. Each field contains at least the number of a queue in which the element is contained. A table of queue records is provided, each containing at least a head pointer to a first element in the queue list. A record of the table is accessed, and the head pointer stored therein is retrieved. The element number represented by the head pointer is accessed for use by the control system.

BRIEF INTRODUCTION TO THE DRAWINGS

A better understanding of the invention will be obtained by reference to the detailed description below, in conjunction with the following drawings, in which.

Figure 1:
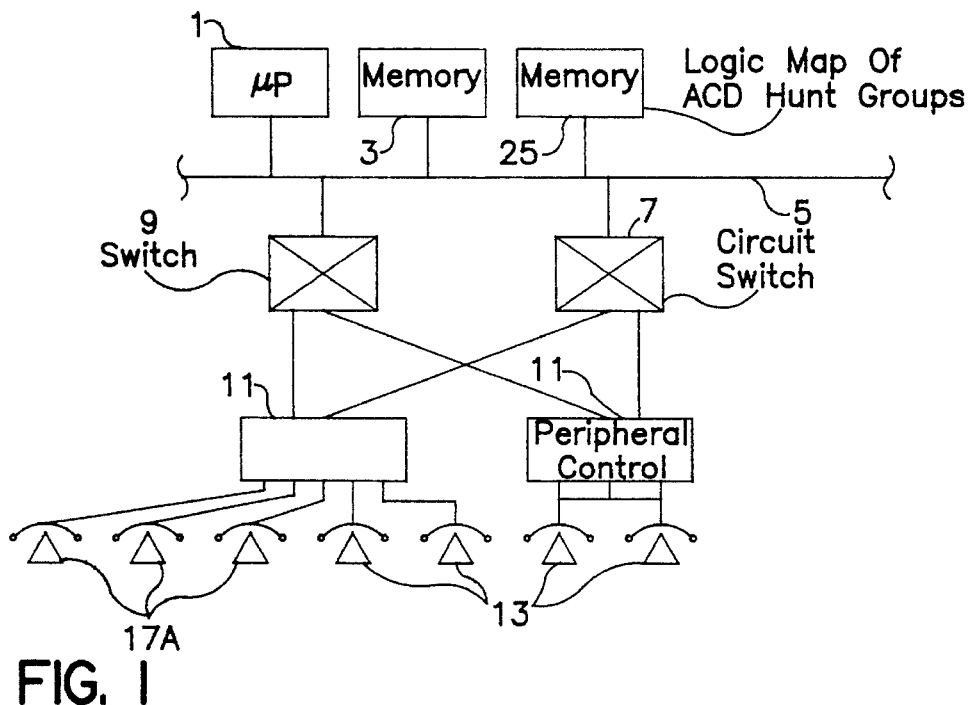
FIG. 1 is a block diagram of a telephone switching system in which the present invention can be implemented.

DETAILED DESCRIPTION OF THE INVENTION:

FIG. 1 illustrates a representative system in which the invention may be contained. The basic system may be as described for example in U.S. Pat. Nos. 4,616,360 and 4,615,028, invented by Conrad Lewis et al, which are incorporated herein by reference.

Basic elements of that system are a microprocessor 1 and a memory 3 accessed by microprocessor 1, both of which are connected to a main system bus 5. Memory 3 contains the main operation programs of the system as well as data as to the status and location of lines and trunks, etc.

A circuit switch 7 and a message switch 9 are connected to bus 5 for control by microprocessor 1. Peripheral control systems 11 are connected to line circuits to which telephones 13 are connected, and are connected to circuit switch 7 for switching telephone circuits between telephones 13 and trunks in order that communication signals may pass therebetween. The peripheral control systems 11 are also connected to message switch 9, whereby control messages from microprocessor 1 may be passed thereto, for controlling the line circuits or other peripheral circuits or for other well known peripheral control duties.

Agent terminals 17 such as telephones are connected to peripheral control system 11.

In general the agent terminals are grouped into hunt groups (which may be only a single hunt group or many hunt groups). When a call is received to e.g. a particular number such as an 800 number, the microprocessor, comparing the called number with a hunt group list stored in memory 3, checks the number stored in memory 3 and routes the call to one of the agent terminals 17A within the designated hunt group.

It should be recognized that in another design, an ACD circuit can be connected to the main bus 5 and can be accessed directly by microprocessor 1 from that bus, or an ACD circuit can be connected to a peripheral control system 11. Whether agent terminals 17A are connected to such ACD circuits or whether they are connected directly to line circuits accessed by the peripheral control system 11 is not consequential to the present invention. Techniques for detecting the off-hook condition of a terminal and of connecting it to another terminal are well known, and a description thereof would be redundant.

In accordance with the prior art, to determine the oldest available agent, a so-called free list of signals representative of the number of each available agent (i.e. the terminal number of that agent), each associated with one or more hunt group numbers, was stored. For example, each hunt group number "2000" would have the customer designated agents associated therewith, e.g. "5001", "5002" . . . "5010". The number of records in the free list would be equivalent to the maximum number of agents which could be programmed into the entire system. Each agent record is associated with a unique agent number.

When an agent logs onto the system, the agent number is added to the end of the free list, thus indicating that the agent is ready to receive calls.

When a call arrives for a hunt group number, the microprocessor accesses the free list and begins a search for the longest idle agent for that hunt group, starting from start to end of the free list. For every agent on the free list, the look-up checks to determine if the agent is a member of the desired hunt group. The first positive determination is thus an indication that the associated agent number designates the longest idle agent, due to the ordering of the list. The microprocessor then controls the telephone system to route the call to that longest idle agent, and the agent record is logically removed from the free list. This is achieved by adjusting the free list linkages to skip the removed record.

When the agent completes the servicing of the call and returns to the idle state, the agent record is logically added to the end of the free list. Since that agent record is added to the end of the free list, the records are automatically in the longest idle agent order if the free list is traversed from beginning to end. As noted earlier, the search time can be excessive if the free list is large and the idle member for the hunt group either does not exist, or exists near the bottom of the free list.

While the telephone system can accommodate multiple hunt groups, the list which contains all of the agents of all of the hunt groups must be traversed. This becomes unwieldy where there are multiple hunt groups controlled by the system and a large number of agents.

In prior art systems, memory 25 is provided connected to bus 5 for access by processor 1. Memory 25 is stand alone, or part of memory 3.

Figure 2:
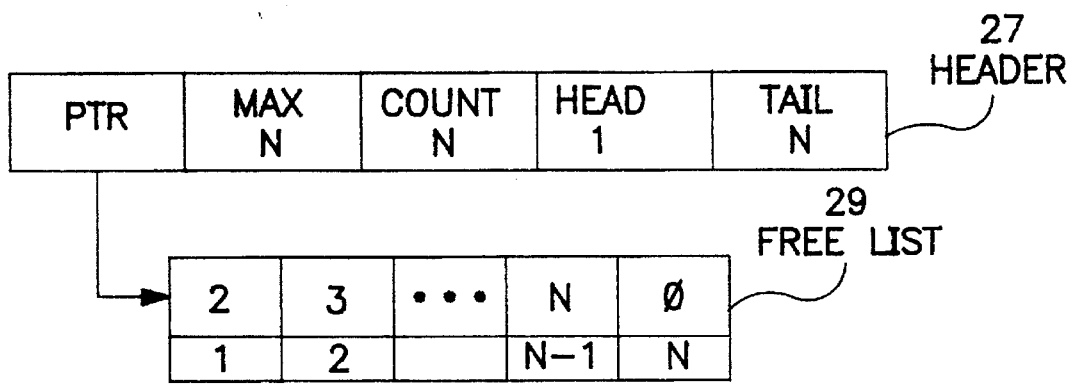
FIG. 2 illustrates the content of a memory in FIG. 1 after initialization in accordance with the prior art.

FIG. 2 illustrates the signal content of memory 25 immediately after initialization when all agents are idle. Memory 25 stores signals which allow the processor to designate which agent (i.e. element) is to be used to service a call.

The stored signals are comprised of a header (record) 27 as well as a free list 29. The free list contains in successive memory locations 1, 2, . . . N-1, N, the identifier of the next "longest-idle" agent. Traversing this list, we see that the longest idle agent is agent "1", followed by "2", "3" and so on. Somewhere in the system, there is an association agent "1"and the agent's extension number (e.g. 5001, 5002, etc.).

A second field MAX contains a count N of the maximum number of elements, e.g. the maximum number of agents which can log onto the system. The next field COUNT contains a signal which indicates the maximum number of free elements, e.g. the number of free agents. Immediately after initialization, the maximum number of elements equals the number of free elements, shown as N.

The next field, HEAD, is an index pointer to the first record in the free list 29 which is free. Immediately after initialization, it is to record 1, as shown.

The last field, TAIL, is an index to the record of the youngest available element, shown as record N of the free list.

If a different scheme than oldest to youngest were used, HEAD would point to the record of the first element of the list, and TAIL to the record of the last.

In use, the microprocessor 1 accesses the header. The pointer PTR points to free list 29 which contains the list of all idle agents. The processor checks the header and then accesses the record of the element, e.g. agent, pointed to by the HEAD byte. In the case of FIG. 2, the pointer HEAD is to the first record in the free list 29.

Figure 3:
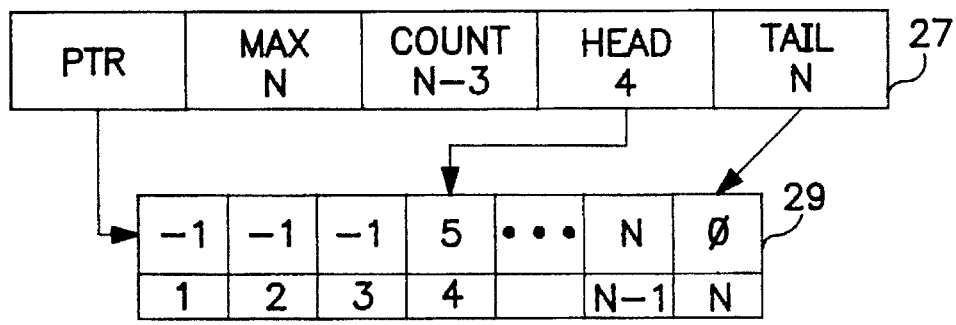
FIG. 3 illustrates the content of the memory in FIG. 1 after initialization at a point during use.

The processor then routes the call to the agent designated by the number stored in the record of the free list (e.g. agent 2), and changes that record number to a special designator, such as -1, as shown in FIG. 3. The number stored in the HEAD byte is then changed to the numeral 2, designating record number 2, and the number stored in the COUNT byte is decremented by 1.

FIG. 3 illustrates the state of the header 27 and free list 29 after the first three agents have been made busy and their records changed to -1. It may be seen that the number stored in the HEAD byte is 4, pointing to the fourth record in the free list. The number stored in the COUNT byte is N-3, which indicates how many agents are left in the free list. The first three records store the numeral -1, since the associated agents are no longer free.

Thus when the processor wishes to connect the call to the longest idle agent, accessing the HEAD field in the header 27 points the processor directly to record number 4 where the search begins for the longest idle agent in the requested hunt group. In case the COUNT has been decremented to zero, the processor can route the incoming call to a recorded announcement. Each record needs to be read until the longest idle agent for the hunt group is found.

Figure 4:
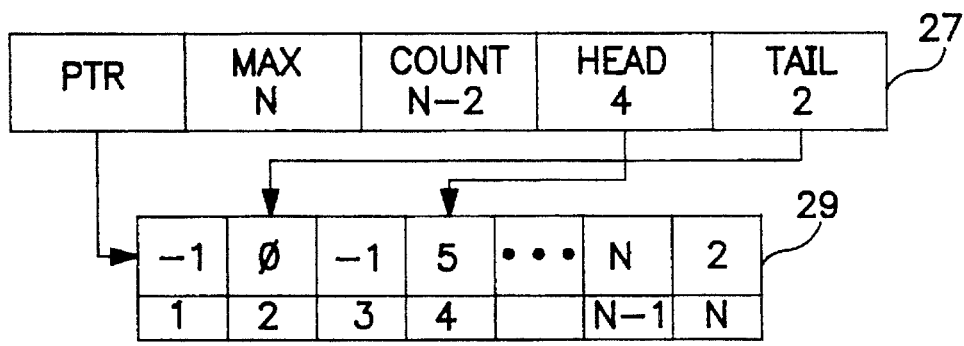
FIG. 4 illustrates the content of the memory of FIG. 1 after initialization at another point during use.

FIG. 4 illustrates the state of the header 27 and free list 29 after, for example agent or element designated by reference numeral 2 has completed its servicing of a call and is returned to the free list. Each successive digit number or element which becomes free is returned to the record immediately following the record number of the youngest idle element, which is designated by the content of the TAIL field in header 27.

In FIG. 4, for example, the HEAD byte in header 27 points to record 4 in the free list, which is the first agent in the free list, while the TAIL byte of header 27 indicates the last agent in the free list is agent 2. When scanning the free list, therefore, the oldest idle element would be indicated immediately as agent 4. Each field in the free list is accessed sequentially, looping from the oldest to the newest record, the TAIL of the free list pointing to record number 2, which represents agent number 2. It may be seen in FIG. 4 that record N contains element number 2, which had been placed in that record since agent 2 had been returned to the free list.

It may be seen that as there are only two elements in free list 29 indicated as being busy, those designated in the first and third records as -1, the byte stored in the COUNT field of header 27 is N-2.

Items returned to the free list need not necessarily be placed as the youngest record, but could be returned anywhere in the free list, depending on the application. Further, the processor could scan the free list in any desired manner, not necessarily in a looping sequence from the oldest idle element to the youngest idle element, as described above.

In accordance with the present invention, there is no need for the processor to scan a list of all of the agent numbers, checking for hunt group membership as previously required. The processor is pointed directly to the oldest idle agent for a specific hunt group, and upon retrieving the element number from the free list can immediately assign the element to service the call. Thus there is substantial improvement in speed of operation by which resources are allocated. This is because through the use of multiple queues in the header, individual separate free lists, each corresponding to a different hunt group, can be utilized.

Figure 5:
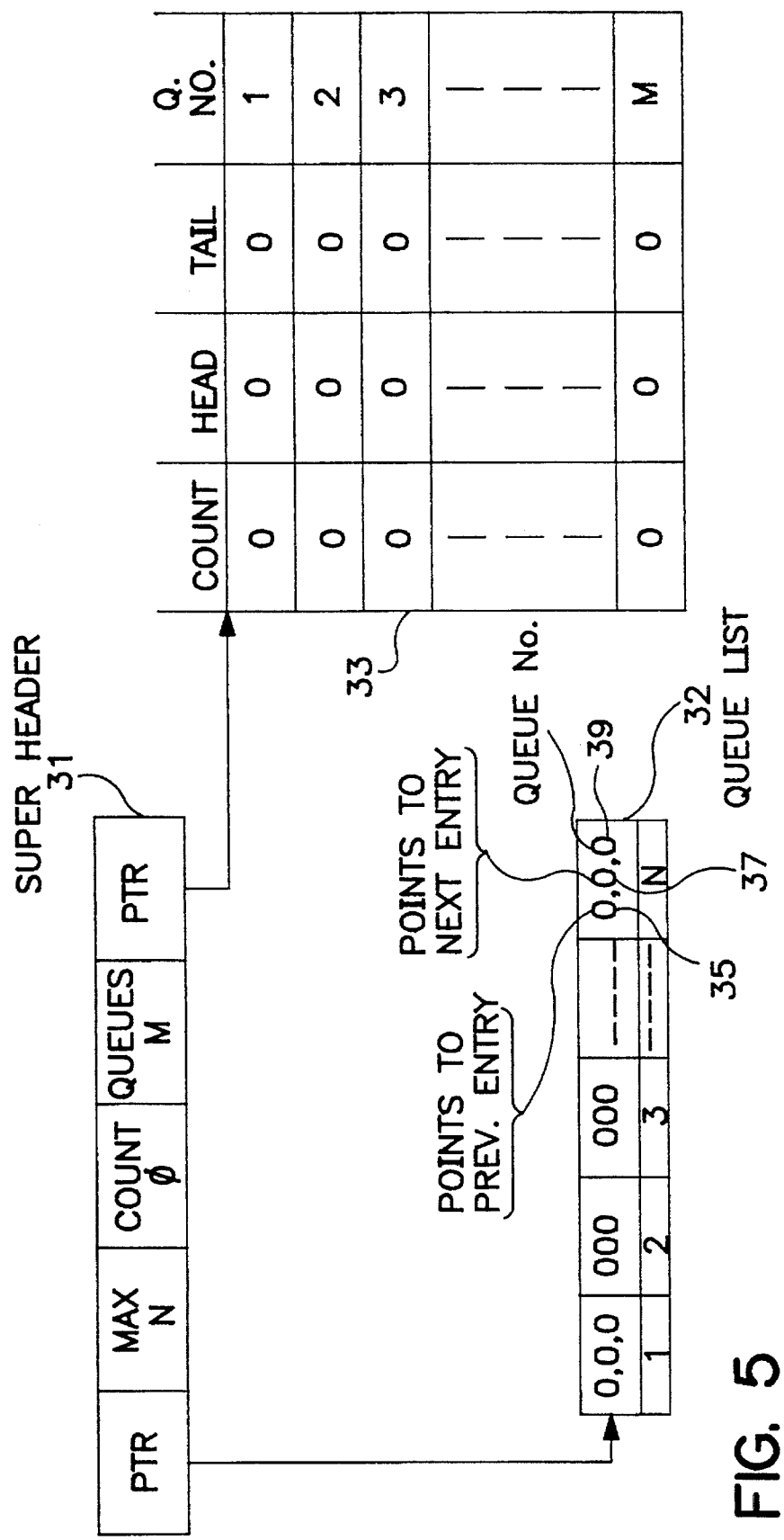
FIG. 5 illustrates the content of the memory of the system of FIG. 1 at initialization in accordance with an embodiment of the invention.

FIG. 5 illustrates the content of memory 25 in accordance with an embodiment of the present invention, which provides the ability to define and associate multiple queues of elements to a resource to be managed.

A superheader 31 contains plural fields. The first is a pointer PTR which points to a queue list 32 as in the prior art. The second field MAX contains a count of the maximum number of elements (agents) that can be utilized. The third field COUNT contains a count of the elements used. In the case of FIG. 5, which shows the state of the memory signals immediately after initialization, the count of elements used is zero as shown, implying no agents are idle.

The fourth field QUEUES contains the number of queue header records stored in another table 33. The last field in the header 31, PTR, points at a record (Queue, shown as Q) number 1, 2, ... M of the queue header table 33. Each queue header record corresponds to a hunt group.

Each record 1, 2, ... M of table 33 contains, as in the embodiment of FIG. 3, a COUNT, HEAD and TAIL field. In the instant immediately after initialization, shown in FIG. 5, each of the fields in each of the records is zero, which designates that no queue list elements are associated with a particular queue header, implying that no agents are idle for that hunt group. In addition, all of the elements within a queue list 32 are initialized to zeros, indicating that the queue list elements are not attached to a queue.

It should be noted that each record of the queue list 32 contains three numbers; the first number 35 which points to a previous queue list (field) element number, a second number 37 which points to the next element number to be used in the free list, and a third number 39 which indicates the queue number, i.e. the record number in the queue header table 33.

Figure 6:
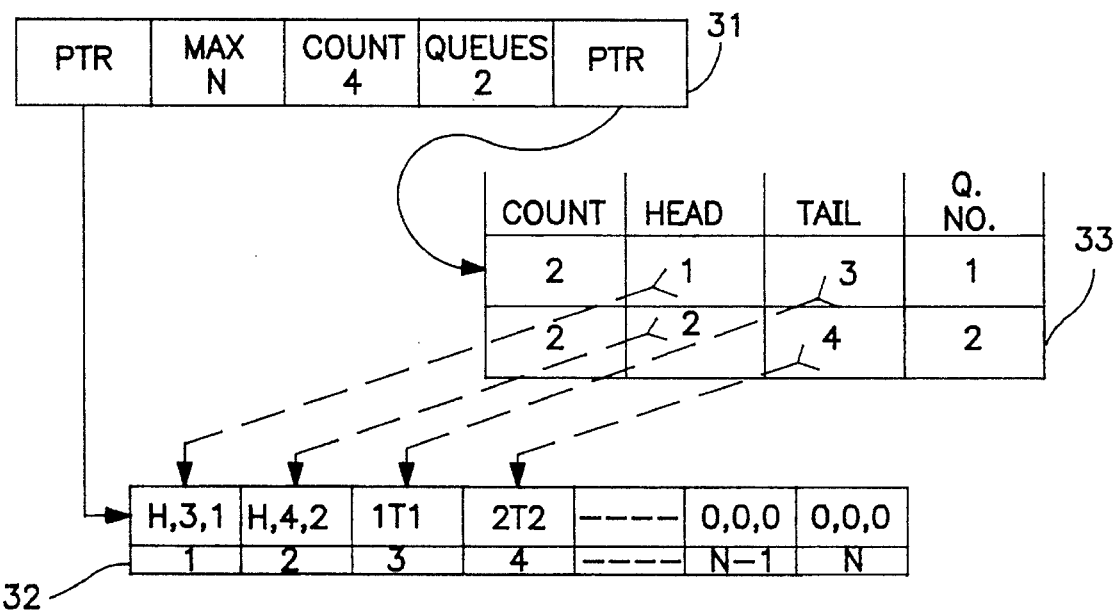
FIG. 6 illustrates the content of the memory of the system of FIG. 1 in accordance with the second embodiment of the invention during use.

An example of operation is shown in FIG. 6. In this example the table 33 has only two records, Q Nos (records) 1 and 2 (right hand column). Thus there are two queues or hunt groups indicated. The number of elements (idle agents) in each queue, indicated in the count field, is two for each. Thus the maximum number of elements is four, which number is stored in the count field of header 31. The number of queues as noted above is two, which number is stored in the QUEUES field in header 31.

In the example shown in FIG. 6, the first and third queue list elements are contained in the first queue, and are shown in Table 33 where the head pointer points to the first queue list element and the tail points to the third (there are two elements in the queue list). The second and fourth queue list elements are contained in the second queue, and as shown in Table 33, the head pointer points to element 2 and the tail pointer points to element 4. The result of this is that the first and second queues each have two queue list elements and are traversable both forward and backward via the established doubly linked list. Elements can be removed or added to any position of the doubly linked list depending on the needs of the application.

From table 33, it may be seen that the head pointer for the two queues are to the first two element records. The queue numbers are stored in numbers of each element record 39, shown in the element records as the numerals 1 and 2. For the element records 3 and 4, again the numbers 39 show record numbers 1 and 2, successively. Or, looking at it a different way, the head and tail pointers in Table 33 are to the first and third element records of queue list 32, and thus the third number stored in the fields of the first and third element record indicators is the numeral 1. Similarly, the third number stored in the second and fourth element record fields are record number 2.

The middle number of each of the records is a pointer to the next useable entry in a queue. In record number 1, the next (37) tail pointer is to the third element of the queue list 32, which is the next element in the queue that can be used, and thus the numeral 3 is shown as the middle number of element 1. However in the third element, there is no next entry, and therefore the numeral is shown as the letter T, indicating that it is the tail record.

Similarly, the next entry in the second and fourth records of queue list 32 are numeral 4 and T respectively.

The first number of the third element record in queue list 32 is a pointer to the previous record entry, which as shown in queue list 32 is 1. Element record 1 is the previous record from the head element record represented by H. Similarly, the previous entry number in the fourth element record (which happens to be the tail field) of the queue list 32 points to the second element record, the immediately previous entry for that queue number. That second element record in queue list 32 has a previous entry number designation as H, which indicates that it is the head element record.

The processor, wishing to access a particular queue, accesses the next available element record from a particular queue number of Table 33, which designates the head queue element record and which designates the tail queue element record of the queue contained in queue list 32. The queue number, e.g. 2 can for example correspond to a particular hunt group, and queue number 1 can relate to a different hunt group.

Assuming that the hunt group designating the queue number 2 is to be utilized, the processor accesses that record, obtains a count of how many elements there are in that queue (2), and is immediately pointed to element record number 2 of queue list 32. This implies that agent 2 is the longest idle agent for that hunt group.

The numerals 1, 2, 3 and 4 were indicated as the element or agent numbers. These correspond to agent extension numbers eg: 5001, 5002, 5003 . . . for queue number 1, element numbers 6001, 6002, 6003 . . . for queue number 2, etc. Once the element numbers have been retrieved, the processor can immediately connect the element designated by the pointed-to number to service the call (i.e. to connect the agent to the call) or to provide the resource within the system as is needed.

It should be noted that while the linkages to the queues are doubly linked, they could be singly linked. Further, when the elements in the queue list are not linked into a queue headed by a queue header, they need not be linked into an "available" list, but instead the fields of the queue list elements (previous, next, queue) may be set to zero. Further, rather than zeros, these elements could be linked into an "available" list.

Thus the present invention manages a queue of free lists without concern for linking busy elements. A free list and associated single busy list may be managed such that a resource item is either on the free list or on the busy list. Both of the prior art and the present invention could be used together, and resources could be allocated and removed from the free list via the prior art method, and allocated and removed from a busy list via the present invention, in which the number of queue headers would equal 1. A free list and any number of busy lists can be managed as noted above, except that the number of queue headers would be greater than 1. A single or many busy lists could be managed as described above, providing the capability independent of the prior art method when the resources to be managed have unique associated identifiers ranging from 1 to N. In this case, resources, based on their identifiers, may be allocated or removed from specific queue headers.

A person understanding this invention may now conceive of alternative structures and embodiments or variations of the above. All of those which fall within the scope of the claims appended hereto are considered to be part of the present invention.

We claim:

1. A method of resource management for elements interfacing a communication control system comprising:
   (a) providing a queue list containing a sequence of fields, each containing at least the number of a queue in which the element is contained,
   (b) providing a table of queue records, each containing at least a head pointer to a first element in the queue list,
   (c) accessing a record of said table, retrieving the head pointer stored therein, and retrieving the element number pointed to by the retrieved head pointer, and
   (d) accessing the element designated by the element number for use by the control system.

2. A method as defined in claim 1, including checking the queue list for the next field and changing the head pointer in the list in said table to the field number of the next field in the queue list.

3. A method as defined in claim 2 including storing in the table in each record a count of the number of elements available for use in each queue.

4. A method as defined in claim 3 including storing in each field of the queue list a pointer to the number of the immediately preceding field containing the same queue number.

5. A method as defined in claim 4 including providing a superheader storing a first pointer pointing to a queue list and a second pointer pointing to a table related to the queue list.

6. A method as defined in claim 5 including providing a superheader containing a first pointer pointing to one of plural queue lists and a second pointer pointing to a particular table of plural tables each related to one of said queue lists.

7. A method as defined in claim 5 including storing in the superheader a total count of said number of elements available for use in all of said queues, and a count of the total number of queues and thus of the total number of records required for a resource management application by said control system.

8. A method of resource management for elements interfacing a communication control system comprising:
   (a) providing plural free lists of said elements available for use by said control system,
   (b) storing as part of a superheader pointer to one of said plural free lists,
   (c) providing a header for storing at least a second pointer to the field in said one list which stores the record of the next element to be used by said control system,
   (d) accessing the header upon receiving a request for service of an element by the control system and obtaining said second pointer,
   (e) accessing the record in said one free list pointed to by said second pointer, and allocating the element to service the call,
   (f) changing the record in said one free list of the allocated element to a special designator different from that of an element designation for indicating that the allocating element is busy,
   (g) checking said one free list to determine the field of the next record in the list, and
   (h) changing said second pointer to point to said another record.

9. A system as defined in claim 8 in which said next element to be used in step (c) is the oldest idle element.

10. A method as defined in claim 9 in which a header record stores a second pointer to the field in said list which stores a youngest idle record.

11. A method as defined in claim 10 including storing the element that has become idle after being busy or the number of an element that has just logged on, either thus becoming a youngest idle element, in the free list in a field immediately following a field which retains record of an element number of an immediately previous youngest idle element.

12. A method as defined in claim 11 in which the free list is checked in step (f) to determine the next successive record.

\* \* \* \* \*